Oct. 22, 1929.  H. A. HECKMAN  1,732,580
DRAW BAR FOR TRACTORS
Filed March 24, 1927
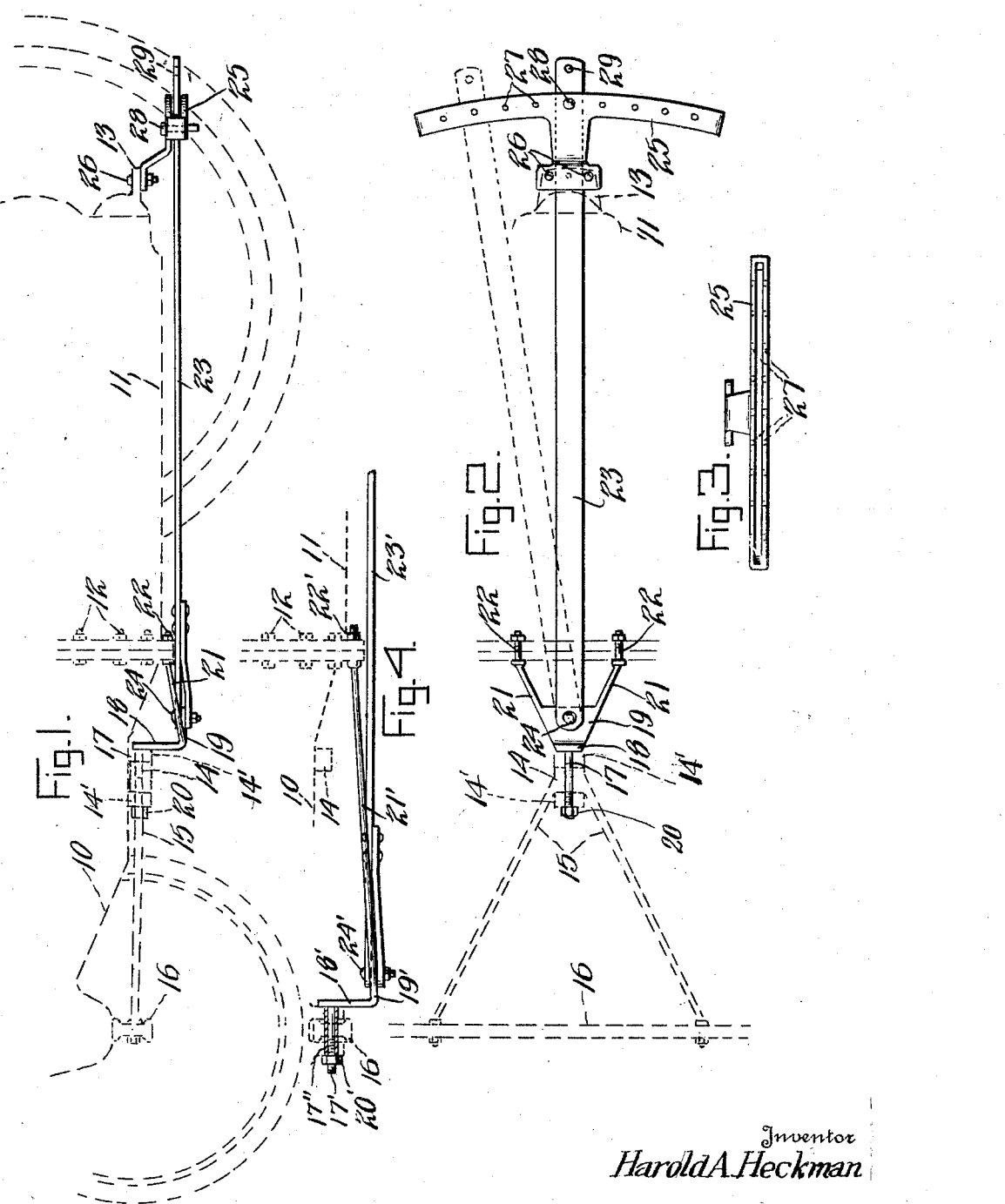
Inventor
Harold A. Heckman
By
Attorney Patented Oct. 22, 1929

1,732,580

UNITED STATES PATENT OFFICE

HAROLD A. HECKMAN, OF VANCOUVER, WASHINGTON

DRAW BAR FOR TRACTORS

Application filed March 24, 1927.  Serial No. 178,004.

My said invention relates to draw bars for tractors, trucks or the like and provides means whereby the torsion is equally distributed to all of the wheels of the tractor. An object is to mount the draw bar so as to overcome the tendency to either raise the front wheels or cause them to plow into the ground when hauling a heavy load. The common practice is to attach the load to a hitch-lug located at the rear of the tractor, which causes excessive strains due to any unevenness of the surface being traveled over.

Another object is in the means for offsetting the load so that the tractor may be operated in a different line from the implement being drawn thereby, as for instance a plow or harrow.

Referring to the accompanying drawings, which are made a part hereof and on which similar reference characters indicate similar parts, Figure 1 is a side elevation of my improved draw bar applied to a tractor of a well-known make, Figure 2, a top plan view of the same, Figure 3, a detail elevation of the rear guide, and Figure 4, a side elevation of a modified form of attaching the draw bar.

In the drawings I have represented my improved draw bar in solid lines and the associated parts of the tractor in dash lines in which the numeral 10 designates the forward casting of the tractor and 11 the rear casting both of which are flanged to receive bolts 12 for securing them together. The rear casting carries the usual hitch-lug 13 while the front casting carries depending lugs 14 to which the radius rods 15 are attached for aligning the front axle 16, all of a well-known construction.

In applying my draw bar, I remove the bolt which attaches the radius rods 15 to the lugs 14 and substitute a bolt 17 which is attached to an upstanding lug 18 on a triangular fulcrum plate 19. This bolt 17 with its nut 20 firmly secures the radius rod in place and also the triangular fulcrum plate 19, which is further braced by means of a pair of diverging arms 21 having parallel threaded extensions 22 which pass through openings previously occupied by two of the bolts 12, thereby forming a three-point suspension for the fulcrum plate which bears all of the strain of the load.

The draw bar 23 is fulcrumed in the plate 19 by a bolt 24 and extends towards the rear of the tractor and through a curved guide yoke 25 which is firmly secured to the hitch-lug 13 by bolts 26. The yoke 25, shown in detail in Figure 3, is provided with aligned openings 27 adapted to receive a pin 28 which also passes through an opening in the draw bar 23 to secure the draw bar in various angular positions for offsetting the implement that is being drawn by the tractor. An opening 29 is provided in the extreme end of the draw bar for the attachment of the implements thereto.

It will readily be seen that all of the strain on the draw bar is transmitted to the plate 19 which is firmly secured to the tractor at a point about midway between the front and rear wheels thereby equalizing the strain so that the tractor is easily steered, also with the draw bar fulcrumed in the center of the tractor as shown, there is no side strain imparted when the rear end of the draw bar is located at an angle or while turning.

In Fig. 4, I have illustrated a modified form of the mounting of the draw bar in which the bolt 17' is surrounded by a sleeve 17'' which takes the place of the usual trunnion bolt in the center of the front axle 16. The bolt 17' is attached to the upstanding lug 18' of the fulcrum plate 19' as in Fig. 1, while the diverging arms 21' are longer than the arms 21 and provided with threaded extensions 22' which pass through openings previously occupied by the bolts 12. The draw bar 23', which is relatively longer, is fulcrumed in the plate 19' by the bolt 24'.

Although I have shown and described my invention as applied to a well-known tractor, it is to be understood that it may be readily adapted to other tractors or to any suitable vehicle, and therefore I do not limit myself to what is shown in the drawings and described in the specification but only as indicated in the appended claims.

Having thus fully described my said inven- tion, what I claim as new and desire to secure by Letters Patent, is:

1. The combination of a vehicle comprising a flanged two part casing, means for attaching said parts together, a depending lug on the forward part, and radius rods adapted to be secured to said depending lug, of a triangular fulcrum plate carrying means for securing said radius rods to said lug and also substitute means for attaching said two part casing together, a draw bar fulcrumed to said fulcrum plate, a guide for the free end of said bar, and means in said guide for securing the free end of said bar in different positions, substantially as set forth.

2. The combination of a vehicle comprising a flanged two part casing, means for attaching said parts together, a depending lug on the forward part, and radius rods adapted to be secured to said depending lug, of a triangular fulcrum plate carrying means for securing said radius rods to said lug and also substitute means for attaching said two part casing together, and a draw bar fulcrumed to said fulcrum plate, substantially as set forth.

In witness whereof, I have hereunto set my hand at Vancouver, Washington, this 16th day of March, A. D. nineteen hundred and twenty-seven.

HAROLD A. HECKMAN.